United States Patent
Sano et al.

(10) Patent No.: US 10,087,510 B2
(45) Date of Patent: Oct. 2, 2018

(54) NON-POST-HEAT TREATED STEEL AND NON-POST-HEAT TREATED STEEL MEMBER

(75) Inventors: Naoyuki Sano, Takarazuka (JP); Tatsuya Hasegawa, Kitakyushu (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 132 days.

(21) Appl. No.: 14/117,964

(22) PCT Filed: May 7, 2012

(86) PCT No.: PCT/JP2012/061648
§ 371 (c)(1),
(2), (4) Date: Jan. 31, 2014

(87) PCT Pub. No.: WO2012/157455
PCT Pub. Date: Nov. 22, 2012

(65) Prior Publication Data
US 2014/0178242 A1  Jun. 26, 2014

(30) Foreign Application Priority Data
May 19, 2011  (JP) ................................. 2011-112260

(51) Int. Cl.
*C22C 38/42* (2006.01)
*C22C 38/02* (2006.01)
(Continued)

(52) U.S. Cl.
CPC .............. *C22C 38/42* (2013.01); *C21D 8/065* (2013.01); *C21D 9/0068* (2013.01); *C21D 9/525* (2013.01);
(Continued)

(58) Field of Classification Search
CPC ..... C22C 38/001; C22C 38/002; C22C 38/02; C22C 38/04; C22C 38/06; C22C 38/24;
(Continued)

(56) References Cited

U.S. PATENT DOCUMENTS 5,135,587 A    8/1992  Olaniran et al.
7,416,616 B2 *  8/2008  Sano et al. .................... 148/320
(Continued)

FOREIGN PATENT DOCUMENTS

CN        1531604      9/2004
JP        2000-73141   3/2000
(Continued)

OTHER PUBLICATIONS

JP2004-277840, Hasegawa et al., published Oct. 2004. (machine translation).*
(Continued)

*Primary Examiner* — Keith Walker
*Assistant Examiner* — John A Hevey
(74) *Attorney, Agent, or Firm* — Clark & Brody (57) ABSTRACT

Non-post-heat treated steel contains: in mass %, C: 0.27 to 0.40%, Si: 0.15 to 0.70%, Mn: 0.55 to 1.50%, P: 0.010 to 0.070%, S: 0.05 to 0.15%, Cr: 0.10 to 0.60%, V: 0.030% or more and less than 0.150%, Ti: more than 0.10%, not more than 0.200%, Al: 0.002 to 0.050%, and N: 0.002 to 0.020%, and optionally one or more of Cu≤0.40% and Ni≤0.30%; the balance being Fe and impurities, wherein [Ti]−3.4[N]−1.5[S]<0, and 0.60<[C]+([Si]/10)+([Mn]/5)+(5[Cr]/22)+(33[V]/20) −(5[S]/7)<0.80. The steel can be used to make a high fatigue strength connecting rod for automobile engines which is fracture-split from a hot forged shape. The non-post-heat treated steel member can have $vE_{RT}$ of 1.0 to 7.0 J/cm$^2$, and σw≥450 MPa.

4 Claims, 3 Drawing Sheets (51) Int. Cl.

| | | |
|---|---|---|
| *C22C 38/04* | (2006.01) | |
| *C22C 38/06* | (2006.01) | |
| *C22C 38/24* | (2006.01) | |
| *C22C 38/28* | (2006.01) | |
| *C22C 38/46* | (2006.01) | |
| *C22C 38/50* | (2006.01) | |
| *C22C 38/60* | (2006.01) | |
| *C21D 8/06* | (2006.01) | |
| *C21D 9/00* | (2006.01) | |
| *C21D 9/52* | (2006.01) | |
| *C22C 38/00* | (2006.01) | |
| *F16C 9/04* | (2006.01) | |
| *F16C 7/02* | (2006.01) | |

(52) U.S. Cl.
CPC .......... *C22C 38/001* (2013.01); *C22C 38/002* (2013.01); *C22C 38/02* (2013.01); *C22C 38/04* (2013.01); *C22C 38/06* (2013.01); *C22C 38/24* (2013.01); *C22C 38/28* (2013.01); *C22C 38/46* (2013.01); *C22C 38/50* (2013.01); *C22C 38/60* (2013.01); *F16C 9/045* (2013.01); *F16C 7/023* (2013.01)

(58) Field of Classification Search
CPC ......... C22C 38/28; C22C 38/42; C22C 38/46; C22C 38/50; C22C 38/60; C21D 8/065; C21D 9/0068; C21D 9/525; F16C 7/00
USPC ............................................ 420/87, 93, 126
See application file for complete search history.

(56) References Cited

U.S. PATENT DOCUMENTS

| | | | | |
|---|---|---|---|---|
| 2006/0000088 | A1* | 1/2006 | Hasegawa | F16C 7/023 |
| | | | | 29/888.092 |
| 2010/0108200 | A1* | 5/2010 | Futamura | C21D 6/001 |
| | | | | 148/503 |
| 2010/0266439 | A1* | 10/2010 | Matsugasako | C22C 38/02 |
| | | | | 420/83 |
| 2011/0048589 | A1* | 3/2011 | Matsuda | C21D 1/18 |
| | | | | 148/645 |
| 2012/0193000 | A1* | 8/2012 | Kozawa et al. | 148/567 |
| 2012/0247619 | A1* | 10/2012 | Obayashi | C21D 1/06 |
| | | | | 148/233 |

FOREIGN PATENT DOCUMENTS

| | | | | |
|---|---|---|---|---|
| JP | 2004-277817 | | 10/2004 | |
| JP | 2004-277838 | | 10/2004 | |
| JP | 2004-277840 | * | 10/2004 | ............ C22C 38/00 |
| JP | 2004-301324 | | 10/2004 | |
| JP | 2005-240149 | | 9/2005 | |
| JP | 2009-155724 | | 7/2009 | |
| JP | 2010-180473 | | 8/2010 | |
| WO | WO 2011/049006 | * | 4/2011 | |

OTHER PUBLICATIONS

W. Liu et al., "Characterization of Ti . . . Microalloyed Steels", Metallurgical Transactions A, vol. 20AA, Oct. 1989 (1907.
Hasegawa et al., "Microalloy Forging . . . Connecting Rod", 2007, and its partial translation.

* cited by examiner

NON-POST-HEAT TREATED STEEL AND NON-POST-HEAT TREATED STEEL MEMBER

TECHNICAL FIELD

The present invention relates to non-post-heat treated steel and a non-post-heat treated steel member produced by using this steel. More specifically, the present invention relates to non-post-heat treated steel suitable for use as a starting material of a non-post-heat treated steel member such as a connecting rod for an automobile engine which is fracture-split after being formed in a predetermined shape through hot forging, and in which high fatigue strength is required, and also relates to a non-post-heat treated steel member such as the above connecting rod produced by using the above steel.

BACKGROUND ART

A fracture splitting method has been used as a producing method of connecting rods for automobile engines.

A connecting rod is split into two pieces at its large end portion connected to a crackshaft, and in general, one of these pieces including a rod portion connected to a piston is referred to as a "rod body", and the other including a semi-circular portion at the large end portion is referred to as a "cap" or the like.

The fracture splitting method is also called as a "cracking method" that hot-forges a material into a shape with the rod body and the cap integrated, that is, the same shape as that when assembled to the crankshaft, and thereafter, the hot-forged material is split into two portions (parts) of the rod body and the cap. Splitting into two parts is carried out as if they are fractured by applying impact load; thus this is referred to as the "fracture splitting".

The fracture splitting method eliminates hot-forging the rod body and the cap separately, and allows tight fitting between fine recesses and projections existing on brittle fracture surfaces which are formed at the time of splitting; therefore, it is possible to eliminate "positioning pins" embedded for preventing positioning deviation between the rod body and the cap. Specifically, the fracture splitting method can significantly decrease producing processes, thereby greatly reducing production cost.

In order to apply the fracture splitting method, it is essential to have a property of being split in a brittle manner by applying impact load. In general, a cutout is so introduced as to generate stress concentration at a portion which is desired to be fractured, and thus deformation of a product is concentrated in the vicinity of the fracture portion; and if a degree of plastic deformation is great until the fracture occurs, both pieces of the product cannot be smoothly fitted to each other at their fracture surfaces after being split. If a number of voids unique to ductile fracture occur on the fracture surfaces, this hinders smooth fitting, and thus it is preferable to attain brittle fractures like "cleavage fracture", which helps to attain smooth fracture surfaces. Specifically, it is preferable to split the product with almost no energy of impact stress absorbed.

High fatigue strength is also required in connecting rods, and thus non-post-heat treated steel that has high strength as it is hot forged is desired.

Various studies have been conducted on non-post-heat treated steel excellent in fracture splitting performance with low toughness and high strength for years. Particularly, investigation has been conducted on high-strength low-toughness non-post-heat treated steel having a duplex microstructure of ferrite and perlite (referred to as "ferrite+perlite microstructure", hereinafter) that improves a disadvantage of non-post-heat treated steel having a perlite microstructure containing carbon of approximately 0.7% in mass %, as described in Patent Document 1, which has been practiced as the steel for a cracking connecting rod in Europe for the first time. This is because perlite is harder than ferrite, and inherently has a low toughness property, so that perlite is preferable for fracture-splitting, but endurance ratio (ratio between tensile strength and fatigue limit) is so small that it is hard to attain high fatigue strength, and perlite is also poor in drill workability for drilling bolt holes due to its high hardness.

V-based non-post-heat treated steel to which vanadium is added is representative of non-post-heat treated steel including the ferrite+perlite microstructure and having high strength. V-based non-post-heat treated steel is widely applied to products for mechanical structures in which high strength and high toughness are required, but low toughness suitable to cracking connecting rods cannot be attained if V-based non-post-heat treated steel is used as it is. To address this disadvantage, there have been suggested and disclosed various methods of providing V-based non-post-heat treated steel with a low toughness property.

In an invention described in Patent Document 2, phosphorus that segregates at grain boundaries to encourage brittleness is positively added, and the phosphorus content is defined so as to enhance the fracture splitting performance. In an invention described in Patent Document 3, the form and the number of sulfide-based inclusions are controlled so as to enhance the fracture splitting performance. Inventions described in Patent Documents 4 to 6 are directed to attaining non-post-heat treated steel having a high-strength low-toughness property by adding titanium. Patent Document 4 describes that TiN inclusions each having a diameter of 5 μm or more are dispersed, thereby enhancing a cracking property, and obtaining appropriate rough fracture surfaces. Patent Document 5 describes that the fracture splitting performance can be improved by controlling the form and the number of sulfide-based inclusions, and controlling "amount of effective Ti" defined based on the titanium content and the nitrogen content, that is, "amount of remaining Ti obtained by subtracting TiN from amount of Ti in the steel" to be 0.003% or more in mass %. In the invention described in Patent Document 6, non-post-heat treated steel having a low-toughness and a low-ductility along with a free-cutting property is attained in such a manner that Ti is added, Zr is compositely added along with Ti if necessary, and Ca of 0.0005 to 0.01% is further added, and at this time, balance of amount of Ti, Zr, and S in the steel is specified so as to generate sufficient amount of (Mn, Ca) S that is complex sulfide of Mn and Ca even after Ti combines, or Ti and Zr combine with S to generate sulfide.

CITATION LIST

Patent Document

[Patent Document 1] U.S. Pat. No. 5,135,587A
[Patent Document 2] JP2004-277840A
[Patent Document 3] JP2000-73141A
[Patent Document 4] JP2004-277817A
[Patent Document 5] JP2009-155724A
[Patent Document 6] JP2005-240149A Non Patent Document

[Non Patent Document 1] W. J. Liu et al.: Metall. Trans. A, 20A (1989) 1907

SUMMARY OF INVENTION

Technical Problem

As aforementioned, disclosed are various techniques that attain high strength non-post-heat treated steel excellent in fracture splitting performance on the basis of V-based non-post-heat treated steel.

The steel whose "P content is more than 0.070%" disclosed in Patent Document 2 has difficulties to stably secure hot workability.

In the steel "that contains 100 to 4000/mm$^2$ of sulfide-based inclusions each having a width of 1 μm or more, and also having average aspect ratio of 10 or less" disclosed in Patent Document 3, it is difficult to industrially produce the steel with good reproducibility, since a producing method of realizing the above number and form of the sulfide-based inclusions is not necessarily apparent.

The steel "in which there exist, in number density, 5/mm$^2$ or more of TiN inclusions whose maximum diameter is 5 μm or more", disclosed in Patent Document 4, has a problem that TiN inclusions have such high hardness that machinability, especially drill workability is likely to be deteriorated.

In the steel "in which amount of effective Ti defined by f =[Ti]−[N]×48/14 is 0.003% or more in mass %, and there exist 100 to 4000/mm$^2$ of sulfide-based inclusions each having a width of 1 μm or more, and an average aspect ratio of the sulfide is 15 or less" disclosed in Patent Document 5, there is a problem that it is not taken into consideration that Ti combines with S to generate Ti-based sulfide (TiS), so that the amount of effective Ti is substantially reduced; therefore, an effect attained by Ti cannot always be achieved.

In the steel disclosed in Patent Document 6, it is taken into consideration that Ti and Zr combine with S to generate TiS and Zr-based sulfide (ZrS), but (Mn, Ca) S plays a chief role in improvement of machinability, and it is essential to contain Ca. There has been a problem that Ca often causes nozzle clogging in a casting process, which hinders smooth production on the actual production basis.

In the light of the current economic situation and global situation, it is a fact that significant increase in price of rare metals such as V and Ti occurs, and it becomes difficult to stably acquire rare metals. Consequently, it has been desired to realize low-toughness high-strength non-post-heat treated steel to which the fracture splitting method is applicable even if the contents of the above elements are reduced as much as possible, specifically, the upper limit of the V content is set to be 0.150% or less, and the upper limit of the Ti content is set to be 0.200%.

An object of the present invention, which has been made in order to solve the problems according to the conventional art, is to provide non-post-heat treated steel suitable for use as a starting material of a non-post-heat treated steel member such as a connecting rod for an automobile engine which is fracture-split after being formed in a predetermined shape through hot forging, and in which high fatigue strength is required, and also provide to a non-post-heat treated steel member such as the above connecting rod produced by using the above steel.

Solution to Problem

The present inventors have prepared Ti-V-based non-post-heat treated steels having various compositions, and have carefully examined a relation between the compositions, strength, toughness, and machinability.

As a result, the findings (a) to (f) were obtained as follows.

(a) Ti effective to strengthening and low-toughening can be grasped by focusing on amount of effective Ti. Note that Ti in the steel is consumed not only in TiN, but also in TiS. Hence, the "amount of effective Ti" should be defined not based on residual amount of Ti obtained by subtracting amount of Ti consumed in generation of TiN from amount of Ti contained in the steel, as specified in the above Patent Document 5, but based on residual amount of Ti obtained by subtracting amount of Ti used in generation of TiN and TiS from amount of Ti contained in the steel.

(b) If the amount of effective Ti which is defined by the above described (a) (simply referred to as "amount of effective Ti", hereinafter) has a negative value, high-strength and low-toughness can be stably attained at high reproducibility. To the contrary, if the amount of effective Ti has a value of 0 or more, strength and toughness sensitively react to slight change in condition of the hot forging process, and thus they easily change, which makes it difficult to stably attain high strength and low toughness at high reproducibility.

(c) The amount of effective Ti having a negative value means that no free dissolved Ti exists as a chemical component. Considering that connecting rods are produced through hot forging, for example, if starting material steel is heated and maintained at a temperature of approximately 1423 to 1523 K (1150 to 1250° C.) before hot forging, TiS particles are partially melted, so that dissolved Ti exists in the austenite host phase; therefore amount of this dissolved Ti can be calculated by using a formula of a solubility product of TiS.

(d) If dissolved Ti, which is generated in the austenite host phase due to TiS particles partially melted during the steel is heated and maintained for hot forging (referred to as "during hot forging" for simplicity, hereinafter), precipitates as composite carbide containing V during a cooling process subsequent to hot forging, significantly great effects of increasing strength and enhancing the fracture splitting performance are attained compared to the case of precipitation of simple carbide including only a single metal element like V or Ti.

(e) The amount of effective Ti influences the amount of dissolved Ti generated in the austenite host phase due to TiS particles partially melted during hot forging as set forth in (d). If the amount of effective Ti is appropriately controlled, it is possible to reproducibly and stably attain a property equivalent to that of actually-used high-strength low-toughness non-post-heat treated steel having the V content of 0.150% or more even if the upper limit of the V content is set to be not more than 0.150%, and the upper limit of the Ti content is set to be 0.200%.

(f) Machinability and fatigue strength of a steel material having a ferrite+perlite microstructure can be integrally grasped based on the hardness of the steel material, and they have a correlation with carbon equivalent. A conventional regression formula may be applicable to find the carbon equivalent. Both high fatigue strength and excellent machinability can be attained by controlling the carbon equivalent to have a value within an appropriate range.

The present invention has been accomplished based on the above findings, and includes non-post-heat treated steel set forth below (1) and (2), and a non-post-heat treated steel member set forth below (3) produced by use of the above non-post-heat treated steel.

(1) Non-post-heat treated steel having a chemical composition comprising: in mass %, C: 0.27 to 0.40%, Si: 0.15 to 0.70%, Mn: 0.55 to 1.50%, P: 0.010 to 0.070%, S: 0.05 to 0.15%, Cr: 0.10 to 0.60%, V: 0.030% or more and less than 0.150%, Ti: more than 0.100%, not more than 0.200%, Al: 0.002 to 0.050%, and N: 0.002 to 0.020%; the balance being Fe and impurities, wherein Et represented by Formula <1> is less than 0, and Ceq represented by Formula <2> is more than 0.60 and less than 0.80:

$$Et=[Ti]-3.4[N]-1.5[S] \quad <1>$$

$$Ceq=[C]+([Si]/10)+([Mn]/5)+(5[Cr]/22)+(33[V]/20)-(5[S]/7) \quad <2>$$

where a symbol of each element enclosed by [ ] in Formulas <1> and <2> denotes a content in mass % of the element in the steel.

(2) The non-post-heat treated steel set forth in (1) further containing, in mass %, one or more of Cu: 0.40% or less, and Ni: 0.30% or less, in lieu of part of Fe.

(3) A non-post-heat treated steel member including the chemical composition set forth in (1) or (2), wherein a Charpy impact value at a room temperature is 1.0 to 7.0 J/cm², and fatigue strength is 450 MPa or more.

Advantageous Effects of Invention

The non-post-heat treated steel of the present invention can be suitably used as a starting material of a non-post-heat treated steel member such as a connecting rod for an automobile engine which is fracture-split after being formed in a predetermined shape through hot forging, and in which high fatigue strength is required. The non-post-heat treated steel member of the present invention is excellent in cracking property and fatigue resistance property, and can be used as a connecting rod for an automobile engine or the like.

DESCRIPTION OF EMBODIMENT

Detail description will be provided on requirements of the present invention, hereinafter.

(A) Chemical Composition of Steel:
A symbol "%" of content of each element denotes "mass %", hereinafter.
C: 0.27 to 0.40%
C is the most important element to decide strength of a steel material, and the C content should be 0.27% or more in order to secure strength of a mechanical product to be used in a non-post-heat treated state in which no heat treatment is applied after being formed into a product member through hot forging as in the present invention. On the other hand, the C content of more than 0.40% causes increase in rate of a perlite microstructure, and decrease in endurance ratio, which deteriorates the fatigue resistance property and machinability. Accordingly, the C content is defined to be 0.27 to 0.40%. It is preferable to set the C content to be 0.30% or more.

Si: 0.15 to 0.70%
Si is an element that contributes to increase in strength as a solid-solution strengthening element, and is effective for effectively carrying out deoxidation of the steel. These effects can be attained with the Si content of 0.15% or more. The excessive Si content rather deteriorates hot workability including a hot forging property as well as machinability, and the Si content of more than 0.70% results in saturation of the above effects; therefore it is preferable to set the upper limit thereof to be 0.70%. Accordingly, the Si content is defined to be 0.15 to 0.70%. Note that it is preferable to set the Si content to be 0.20% or more, and to be 0.60% or less.

Mn: 0.55 to 1.50%
Mn contributes to increase in strength as a solid-solution strengthening element. Mn combines with S to generate MnS, and has an effect of enhancing machinability. In order to attain these effects, the Mn content should be 0.55% or more. The Mn content of more than 1.50% rather saturates the effects, increases the cost, and causes excessive hardenability, which may generate a bainitic microstructure that deteriorates the fracture splitting performance and machinability. Accordingly, the Mn content is defined to be 0.55 to 1.50%. It is preferable to set the Mn content to be 0.60% or more, and 1.40% or less.

P: 0.010 to 0.070%
is an element that contributes to increase in strength as a solid-solution strengthening element, and is likely to segregate at the grain boundaries, which deteriorates toughness of the steel. This property has a preferable effect for the fracture splitting performance. In order to attain this effect, the P content should be 0.010% or more. The excessive P content deteriorates hot workability including the hot forging property, and the P content of more than 0.070% causes significant deterioration of hot workability. Accordingly, the P content is defined to be 0.010 to 0.070%. It is preferable to set the P content to be 0.030% or more, and 0.060% or less.

S: 0.05 to 0.15%
S is an impurity usually contained in steel, and combines with Mn and Ti to generate sulfide such as MnS and TiS, and has an effect to enhance machinability; thus S is positively added. As described later, TiS determines the amount of effective Ti, and becomes partially melted at a temperature for hot machining, which determines the amount of dissolved Ti in the austenite host phase; for this reason, enough S should be added to generate sufficient amount of TiS. Accordingly, the S content of 0.05% or more is needed. The excessive S content, particularly, the S content of more than 0.15% generates segregation defect in cast pieces, and deteriorates hot workability including the hot forging property. Accordingly, the S content is defined to be 0.05 to 0.15%. It is preferable to set the S content to be 0.07% or more, and 0.13% or less.

Cr: 0.10 to 0.60%
Cr contributes to increase in strength as a solid-solution strengthening element. This effect can be attained with the Cr content of 0.10% or more. To the contrary, the Cr content of more than 0.60% rather generates a bainitic microstructure that deteriorates the fracture splitting performance and machinability. Accordingly, the Cr content is defined to be 0.10 to 0.60%. It is preferable to set the Cr content to be 0.15% or more, and 0.50% or less.

V: 0.030% or more and less than 0.150%

V precipitates in a ferrite matrix as carbide, and has an effect to contribute to increase in strength as a precipitation strengthening element, and to enhance the fracture splitting performance. Carbide containing both V and Ti is generated by adding V along with Ti, thereby further enhancing the effect to increase strength and enhance the fracture splitting performance. The V content should be 0.030% or more to attain such an effect. Meanwhile, V is a rare metal element, and extremely expensive among alloy elements to be added in the steel, and currently, the price of V is significantly increased in the market, and stable obtainment of V has become more difficult. Accordingly, it is preferable to reduce the V content as much as possible, and thus in the present invention, the upper limit of the V content is defined to be less than 0.150% that is approximately one half of the upper limit of the V content in conventional common V-containing non-post-heat treated steel. It is preferable to set the V content to be 0.050% or more.

Ti: more than 0.100%, 0.200% or less

Ti combines with nitrogen to generate TiN, and TiN functions as pinning particles for suppressing coarsen of grains during hot working. Ti combines with S to generate TiS, and TiS has an effect of enhancing machinability. TiS becomes partially melted at a temperature for hot working, thereby generating dissolved Ti and dissolved S in the austenite host phase. Amount of the dissolved Ti and the dissolved S is dependent on the solubility product of TiS. A formula for finding the solubility product of TiS will be described later. Ti and S having greater amount than this solubility product at the above temperature generates TiS particles. Since the solubility product becomes greater as the temperature increases, if Ti and S existing as TiS particles at a room temperature are maintained at a temperature for hot forging, the TiS particles become partially melted from the surfaces of the TiS particles; and consequently amount of Ti and S dissolved in the austenite host phase becomes increased. Specifically, TiS particles have an effect of decomposing itself at a temperature for hot forging and increasing amount of dissolved Ti. The dissolved Ti precipitates during the cooling process subsequent to hot forging, and if V exists at this time, the dissolved Ti is likely to precipitate as carbide combined with V. Carbide containing both V and Ti has an effect to further increase strength, and further enhance the fracture splitting performance, compared to simple carbide including only V or Ti. In order to attain such an effect, the Ti content should be more than 0.100%. Meanwhile, Ti is a rare metal element as similar to V, is a relatively expensive element among alloy elements to be added in the steel, and is likely subjected to influence of the market, which makes it difficult to obtain Ti at stable cost. Hence, it is preferable to reduce the Ti content as much as possible, and the upper limit of the Ti content is defined to be 0.200% in the present invention. It is preferable to set the Ti content to be 0.110% or more, and 0.190% or less.

Al: 0.002 to 0.050%

Al is an element effective for deoxidation of the steel, and the Al content should be 0.002% or more so as to attain this effect. The Al content of more than 0.050% excessively generates hard aluminum particles, which significantly deteriorates machinability. Accordingly, the Al content is defined to be 0.002 to 0.050%. It is preferable to set the Al content to be 0.004% or more, and 0.040% or less.

N: 0.002 to 0.020%

N is an effective element that combines with Ti to generate TiN serving as pinning particles for suppressing coarsen of grains during hot working. The N content should be 0.002% or more to attain this effect. Because TiN is hard, the N content of more than 0.020% excessively generates TiN particles, which significantly deteriorates machinability, and Ti contained in the steel is consumed in TiN before generating TiS because of generation of TiN. In the present invention, it is necessary to partially melt TiS during hot forging so as to generate dissolved Ti; therefore, generation of TiS is essential, and it is unfavorable to generate great amount of TiN prior to generation of TiS. Accordingly, the N content is defined to be 0.002 to 0.020%. It is preferable to set the N content to be 0.015% or less.

One of the non-post-heat treated steels of the present invention has a chemical composition comprising the aforementioned elements from C to N with the balance being Fe and impurities, and the chemical composition satisfies the conditions of Et and Ceq described later.

The term "Impurities" denotes those impurities which come from ores and scraps as row materials, manufacturing environments, and so on during industrially producing the steel.

The other of the non-post-heat treated steels of the present invention contains one or more of Cu and Ni in lieu of part of Fe, and has a chemical composition that satisfies the conditions of Et and Ceq.

Hereinafter, description will be provided on the operational advantages of Cu and Ni that are optional elements, and on the reason for limiting the contents thereof.

Cu: 0.40% or less

Cu contributes to increase in strength as a solid-solution strengthening element, and Cu may be added so as to attain this effect. The Cu content of more than 0.40% likely causes hot crack, or likely generates a bainitic microstructure, which may deteriorate the fracture splitting performance and machinability. Accordingly, the amount of Cu is defined to be 0.40% or less if contained. It is preferable to set the amount of Cu to be 0.30% or less if contained.

On the other hand, in order to stably attain the solid-solution strengthening effect resulted from addition of Cu, it is preferable to set the amount of Cu to be 0.05% or more, and more preferably 0.10% or more, if contained.

Ni: 0.30% or less

Ni contributes to increase in strength as a solid-solution strengthening element, and has an effect of suppressing hot crack caused by containing Cu, and thus Ni may be added so as to attain this effect. The Ni content of more than 0.30%, however, only results in increase in cost. Accordingly, the amount of Ni is defined to be 0.30% or less if contained. It is preferable to set the amount of Ni to be 0.20% or less if contained.

Meanwhile, in order to stably attain the solid-solution strengthening effect caused by Ni, it is preferable to set the Ni content to be 0.05% or more, and more preferably 0.10% or more if contained. It is preferable to set the amount of Ni to be not less than one half of the amount of Cu if Ni is contained along with Cu in order to suppress hot crack caused by containing Cu.

Cu and Ni may be contained in combination, or either of them may be contained on the standalone basis, in the above range. If Cu and Ni are contained in combination, the total amount of Cu and Ni may be 0.70%, obtained as a sum of the respective upper limit of Cu and Ni, but it is preferable to set this total amount to be 0.50% or less, more preferably 0.35% or less.

Et: less than 0

In the non-post-heat treated steel of the present invention, Et represented by the following Formula <1> should be less than 0. As described above, a symbol of each element enclosed by [ ] in Formula <1> denotes a content in mass % of the element in the steel.

$$Et=[Ti]-3.4[N]-1.5[S] \qquad <1>$$

The above will be described, hereinafter.

The gist of the present invention is to obtain high-strength non-post-heat treated steel having high fatigue strength and excellent in fracture splitting performance in which V containing non-post-heat treated steel is used as a base material, Ti is contained in this base material, the total content of V and Ti is set to be approximately 0.3% at most, and the amount of effective Ti is controlled, wherein the steel is heated and maintained during hot forging so as to supply dissolved Ti existing in the austenite host phase through partial melting of TiS particles. Hereinafter, description will be provided on Et of Formula <1> that represents the amount of effective Ti.

As aforementioned, the "amount of effective Ti " in the present invention denotes not the residual amount of Ti obtained by subtracting the amount of Ti consumed in generation of TiN from the amount of Ti contained in steel, as specified in Patent Document 5, but the residual amount of Ti obtained by subtracting the amount of Ti used for generation of TiN and TiS from the amount of Ti contained in the steel. This is because Ti contained in the steel is consumed not only by TiN but also by TiS sulfide.

Taking atomic weights of N and S into consideration, the amount of Ti used for generation of TiN and TiS is 3.4(=48/14) times as much as the N content, and 1.5(=48/32) times as much as the S content, respectively. Hence, the amount of effective Ti (Et) is defined by the above Formula <1>.

Et of less than 0 (referred to as "Et<0", hereinafter) denotes that the amount of effective Ti has a negative value, that is, no free dissolved Ti exists as a chemical component, in other words, this means that entire Ti in the steel combines with N and S to generate TiN and TiS. In order to stably attain high-strength and low-toughness at high reproducibility, it is essential to satisfy this condition.

In order to generate carbide containing both V and Ti that contribute to strengthening and low-toughening in the cooling process subsequent to hot forging, it is necessary that dissolved Ti exists in the austenite host phase. If Et<0 is satisfied, it seems that no dissolved Ti exists, but if starting material steel is heated and maintained at a temperature of approximately 1423 to 1523 K (1150 to 1250° C.) before hot forging, for example, TiS particles are partially melted at this time, which allows dissolved Ti to exist in the austenite host phase, and this Ti contributes to generation of carbide containing both V and Ti. The solubility product of TiN is extremely smaller than that of TiS, and thus melting of TiN particles is small enough to be ignored with respect to melting of TiS particles.

If Et<0 is satisfied, entire Ti contained in the steel is fixed as TiN and TiS in a state at a room temperature before heating in the above hot forging. Heating and maintaining the steel during hot forging makes it easy to appropriately adjust the amount of dissolved Ti to be generated in the austenite host phase through partial melting of TiS particles, thereby stably attaining high-strength and low-toughness at high reproducibility. To the contrary, if Et≥0 is satisfied, the amount of dissolved Ti in the austenite host phase is so great that such a problem may be caused that bainite is likely to be generated, resulting in hindrance of low toughening. Because of the great amount of dissolved Ti, Ti generates simple carbide (TiC) by itself in addition to melting into VC. Contrary to VC, TiC easily precipitates in austenite as well, so that TiC is subjected to strong influence of machining-induced precipitation; specifically, TiC is subjected to influences of the temperature range and the working ratio of hot forging, which changes the size and the distribution condition of precipitating TiC particles, resulting in great variation in strength of connecting rods. Accordingly, Et should be defined to be Et<0.

Ceq: more than 0.60 and less than 0.80

In the non-post-heat treated steel of the present invention, Ceq represented by the following Formula <2> should be more than 0.60 and less than 0.80 (referred to as "0.60<Ceq<0.80", hereinafter). As described above, a symbol of each element enclosed by [ ] in Formula <2> denotes a content in mass % of the element in the steel.

$$Ceq=[C]+([Si]/10)+([Mn]/5)+(5[Cr]/22)+(33[V]/20)-(5[S]/7) \qquad <2>$$

The above will be described, hereinafter.

Ceq defined by Formula <2> is an empirical formula representing hardness of the non-post-heat treated steel by using a regression equation of contents of major additive elements, and it is generally referred to as "carbon equivalent".

If a value of Ceq is greater, hardness of the starting material becomes greater, and thus machinability becomes deteriorated. On the other hand, if a value of Ceq is smaller, hardness of the starting material becomes smaller, and thus fatigue strength becomes deteriorated. Such non-post-heat treated steel that contains both Ti and V of the above amounts has a ferrite matrix reinforced by carbide containing V and Ti; therefore, sufficient fatigue strength can be attained even though Ceq is less than 0.80, and Ceq should be less than 0.80 in order to secure machinability. Meanwhile, Ceq of 0.60 or less significantly deteriorates fatigue strength. Accordingly, Ceq is defined to be 0.60<Ceq<0.80. It is preferable to set Ceq to be 0.65 or more, more preferably 0.67 or more.

In the production process of the non-post-heat treated steel of the present invention, the steel is deoxidized with Al so as to stabilize deoxidization, and composite carbide is generated with Ti along with V. In the production process of the non-post-heat treated steel of the present invention, in order to prevent deterioration of the yield rate of Ti, Ti is added after the steel is sufficiently deoxidized with Al for example, that is, the steel is melted while adding Al and Ti in the order of Al and Ti.

(B) Non-Post-Heat Treated Steel Member

The non-post-heat treated steel member of the present invention has the chemical composition set forth in (A), its Charpy impact value at a room temperature is 1.0 to 7.0 J/cm², and its fatigue strength is 450 MPa or more. This Charpy impact value denotes a value obtained by using V notch test specimens set forth in JIS Z 2242 (2005), and this value is referred to as "$_VE_{RT}$", hereinafter. The fatigue strength denotes a maximum stress that causes no fracture in $10^7$ cycles of repetitively applying stress in the Ono type rotating bending fatigue test using smooth specimens, and the fatigue strength is referred to as "σw", hereinafter.

$_VE_{RT}$ represents amount of energy per 1 cm² that is consumed as the work of plastic deformation at the time of fracturing, and thus this may be used as an index of evaluating the fracture splitting performance. In the member having the chemical composition set forth in the above (A), if $_vE_{RT}$ becomes more than 7.0 J/cm$^2$, ductile fracture is generated at the time of fracture-splitting, which may hinder tight fitting. Because smaller $_vE_{RT}$ more likely causes brittle fracture, it is preferable that $_vE_{RT}$ is as small as possible in the light of the fracture splitting performance and fitting after fracture, and $_vE_{RT}$ of 1.0 J/cm$^2$ or more causes no inconvenience during transportation and the like.

If σw is 450 MPa or more, it is possible to secure sufficient fatigue strength required in connecting rods for automobile engines. It is preferable that σw is as great as possible, but the upper limit thereof is approximately 550 MPa in the case of the member having the chemical composition set forth in the above (A).

The non-post-heat treated steel member of the present invention, whose $_vE_{RT}$ is 1.0 to 7.0 J/cm$^2$ and σw is 450 MPa or more, may be produced by forming the steel having the chemical composition set forth in the above (A) through hot forging after the steel is maintained at a temperature T that allows the value y represented by using the following Formulas <3> and <4> to be more than 0.001, and not more than 0.020.

$$y=\{Et+(Et^2+6\times\alpha(T))^{0.5}\}/2 \quad <3>$$

$$\alpha(T)=10^{\{-(17640/T)+8.20\}} \quad <4>$$

where α(T) represents a function of the temperature T, and this temperature is indicated as an absolution temperature (unit: K).

The present invention employs the following features: that the chemical composition of the steel is adjusted to be "Et<0", entire Ti in the steel is fixed as TiN and TiS in a state at a room temperature before hot forging, TiS particles are allowed to be partially melted so as to elute dissolved Ti in the austenite host phase by heating and maintaining the steel during hot forging for forming the steel into a predetermined shape, and this dissolved Ti contributes to generation of carbide containing both V and Ti during the cooling process subsequent to the hot forging.

The above Formulas <3> and <4> define the amount of dissolved Ti that exists in the austenite host phase due to TiS particles partially melted by heating and maintaining the steel during the above hot forging, and "y" represents the amount of the above dissolved Ti. Note that a unit for the amount of dissolved Ti is mass %, and thus this is equivalent to Ti concentration in mass %.

How much TiS particles become melted in austenite, that is, how much amount of the dissolved Ti has an equilibrium relationship with the TiS particles may be calculated based on the solubility product. One of representative formulas regarding the solubility product of TiS is the following Formula <5> set forth in non-Patent Document 1.

$$\log [Ti][S]=-(17640/T)+8.20 \quad <5>$$

Herein, [Ti] and [S] denote respective contents in the steel in mass % of Ti and S both of which are involved in generation of TiS.

The above Formula <5> may be converted into the following Formula <6>.

$$[Ti]=10^{\{-(17640/T)+8.20\}}/[S] \quad <6>$$

Assuming [Ti][S]=α(T), this may be substituted into Formula <5> so as to obtain Formula <4>, and this may also be converted into the following Formula <7>.

$$[Ti]=\alpha(T)/[S] \quad <7>$$

If the temperature T of α(T) is decided, α(T) becomes a constant, and thus a relation between [Ti] and [S] gives a hyperbola.

Figure 1:
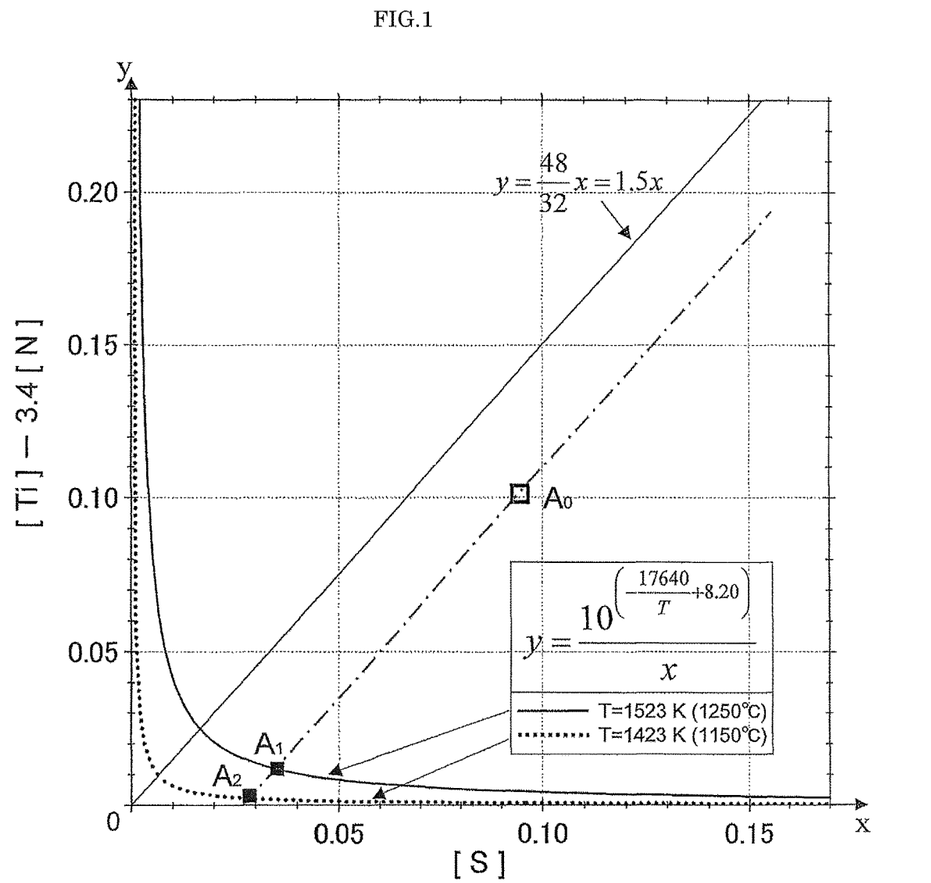
FIG. 1 is a drawing showing hyperbolas indicating respective solubility products of TiS at 1523 K (1250° C.) and at 1423 K (1150° C.), and a straight line corresponding to a stoichiometric ratio of TiS, as an example for explaining concentrations of Ti and S dissolved in austenite during hot forging. In the drawing, an abscissa [S] represents the S content in mass %, that is, the concentration of S (mass %), and an ordinate [Ti] represents the Ti content in mass %, that is, the concentration of Ti (mass %).

Detailed description will be provided with reference to FIG. 1 showing the solubility product of TiS at 1523 K (1250° C.) and at 1423 K (1150° C.), hereinafter.

As an example, two hyperbolas in the first quadrant are obtained based on Formula <7> for the cases of T=1523 K and 1423 K as shown in FIG. 1, where [S] is defined as the x axis, and [Ti]−3.4 [N] is defined as the y axis. The reason for defining not [Ti] but [Ti]−3.4 [N] as the y axis is based on that it is considered that TiN is generated before TiS is generated, and thus the amount of Ti in mass % used for generation of TiS is determined by subtracting the amount of Ti consumed in TiN from the amount of Ti existing in the steel. Such treatment is required because [Ti] and [S] represented in Formula <5> indicate the contents of Ti and S in the steel, both of which are involved in generation of TiS. Although, as for [S], MnS may be deemed as particles in which S is consumed, it is appropriate to consider that TiS is generated prior to generation of MnS; therefore, it is supposed herein that entire S contained in the steel primarily becomes involved in generation of TiS.

The stoichiometric ratio of TiS is 1:1, and if this is converted into a mass ratio, it becomes 1.5:1; thus FIG. 1 shows a straight line passing through the origin with inclination of 1.5. If Ti and S generate TiS, or if Ti and S are melted from TiS, the ratio of 1.5:1 is maintained, and thus it may be considered that it moves along this straight line of FIG. 1.

If the amount of Ti (Ti content in mass % involved in generation of TiS) and the amount of S (S content in mass % involved in generation of TiS) in the steel are represented by the point $A_0$ in FIG. 1, the point $A_0$ lies above the two hyperbolas, which means that the product of the amount of Ti and the amount of S in the steel is greater than the solubility product at any temperature, and thus TiS is generated at both 1523 K and 1423 K. A region equivalent to a portion below the hyperbolas indicates a range of the amount of Ti and the amount of S that can be dissolved in austenite, and if a straight line passing through the point $A_0$ with inclination of 1.5 is drawn, a point at which this straight line intersects the hyperbola representing the solubility product at 1523 K is defined as $A_1$, and a point at which this straight line intersects the hyperbola representing the solubility product at 1423 K is defined as $A_2$, respectively, the respective coordinates of these points $A_1$ and $A_2$ indicate respective amounts of Ti and S that can be dissolved in austenite at the respective temperatures. Putting the focus on the dissolved Ti now, it is necessary to find values of the y coordinates of the point $A_1$ and the point $A_2$. A method of finding an intersection point between the straight line passing through the point $A_0$ with inclination of 1.5 and the hyperbola in the first quadrant that represents the solubility product at 1523 K or 1423 K is nothing but an arithmetical procedure to find a coordinate of the intersection point assuming that equations for this straight line and the hyperbola are equal. If the equation is solved, two values are obtained for the value y because there is ± before the radical sign, but the value y in the first quadrant is physically significant value, and thus a solution having a sign of plus before the radical sign is employed.

Taking [Ti]−3.4 [N]−1.5 [S]=Et into account, it is found that the value y that is the y coordinate of the intersection point can be given by Formula <3>.

If the steel is maintained at the temperature T that allows the above value y, that is, the amount of dissolved Ti in mass % in the austenite host phase to be more than 0.001, and not more than 0.020, and then is formed through hot forging, it is possible to provide the non-post-heat treated steel member including the chemical composition set forth in (A) with the properties that $_rEd_{RT}$ is 1.0 to 7.0 J/cm$^2$, and σw is 450 MPa or more at high stable reproducibility.

If the value y represented by using Formulas <3> and <4> is not more than 0.001 (i.e. 0.001 or less), the amount of dissolved Ti in the austenite host phase may be too small to satisfy both properties that $_rE_{RT}$ is 1.0 to 7.0 J/cm$^2$, and σw is 450 MPa or more at the same time. On the other hand, if the value y is more than 0.020, the amount of dissolved Ti is so great that such a problem may be caused that the bainitic microstructure is encouraged to grow, or simple TiC carbide precipitates, resulting in great variation of strength.

The steel, which is a material to be treated, is maintained at the temperature T during hot forging, and the temperature T denotes a temperature at a central portion of the material to be treated.

A time period in which the temperature of the material to be treated becomes uniform is enough for a time period for maintaining the material at the temperature T, and this time period may be variously changed depending on the heating method, the heat capacity of heating facility and the like; and it is preferable to heat and maintain a billet for one minute or more when the billet is heated and maintained by high frequency induction heating, and it is preferable to heat and maintain a billet for 15 minutes or more when the billet is heated and maintained in a furnace, for example. It is preferable to set the above temperature T to be within a range of 1423 to 1523 K (1150 to 1250° C.).

The steel is preferably subjected to allowing cooling in the atmosphere after hot forging, for example. Rapid cooling using water or oil after hot forging is unfavorable in the present invention. Wing cooling (forced air cooling) for cooling the hot forged member by sending air to the member with fans may be employed, and in this case, it is necessary to prevent a cooling speed from being excessively high so as not to generate great amount of the bainitic microstructure. Bainitic microstructure in an area ratio of up to 10% may be contained in the ferrite+perlite microstructure because moderate generation of the bainitic microstructure never greatly affects the fracture splitting performance. The critical cooling speed for generation of the bainitic microstructure is varied depending on the selection of the chemical composition of the steel, and as far as it is within the range of the present invention, the cooling speed after hot forging may be adjusted to be within a range of approximately 10 to 100° C./min, thereby substantially attaining the ferrite +perlite microstructure where mixture of the bainitic microstructure does not matter.

More detailed description will be provided on the present invention based on the following Example, hereinafter.

EXAMPLE

Each Steel 1 to 20 having the chemical composition shown in Table 1 was melted by 50 kg in a vacuum furnace, and produced into an ingot. In Table 1, "Et" and "Ceq" respectively represented by Formulas <1> and <2> are also described.

Each Steel 1 to 11 in Table 1 has a chemical composition within the range specified by the present invention. To the contrary, each Steel 12 to 20 in Table 1 has a chemical composition deviating from the range specified by the present invention, and Steel 20 is equivalent to the steel for a cracking connecting rod set forth in Patent Document 1, which has already been practiced in Europe.

TABLE 1

| | Chemical Composition (mass %) Balance: Fe and Impurities | | | | | | | | | | | | |
|---|---|---|---|---|---|---|---|---|---|---|---|---|---|
| Steel | C | Si | Mn | P | S | Cr | V | Ti | Al | N | Others | Et | Ceq |
| 1 | 0.30 | 0.24 | 0.80 | 0.052 | 0.110 | 0.23 | 0.140 | 0.110 | 0.004 | 0.0052 | — | −0.0727 | 0.689 |
| 2 | 0.31 | 0.26 | 1.00 | 0.049 | 0.104 | 0.21 | 0.110 | 0.130 | 0.005 | 0.0060 | — | −0.0464 | 0.691 |
| 3 | 0.31 | 0.23 | 1.25 | 0.054 | 0.106 | 0.20 | 0.082 | 0.135 | 0.005 | 0.0055 | — | −0.0427 | 0.688 |
| 4 | 0.35 | 0.21 | 1.26 | 0.052 | 0.115 | 0.33 | 0.064 | 0.165 | 0.004 | 0.0061 | — | −0.0282 | 0.721 |
| 5 | 0.35 | 0.45 | 1.26 | 0.052 | 0.115 | 0.42 | 0.055 | 0.162 | 0.004 | 0.0063 | — | −0.0319 | 0.751 |
| 6 | 0.38 | 0.33 | 0.91 | 0.055 | 0.114 | 0.21 | 0.080 | 0.169 | 0.005 | 0.0058 | — | −0.0217 | 0.693 |
| 7 | 0.39 | 0.48 | 0.91 | 0.055 | 0.120 | 0.20 | 0.110 | 0.170 | 0.006 | 0.0120 | — | −0.0508 | 0.761 |
| 8 | 0.40 | 0.32 | 1.10 | 0.056 | 0.120 | 0.22 | 0.079 | 0.171 | 0.006 | 0.0115 | — | −0.0481 | 0.747 |
| 9 | 0.39 | 0.49 | 0.90 | 0.022 | 0.099 | 0.15 | 0.075 | 0.157 | 0.005 | 0.0165 | — | −0.0476 | 0.706 |
| 10 | 0.40 | 0.52 | 1.18 | 0.061 | 0.130 | 0.18 | 0.068 | 0.185 | 0.006 | 0.0098 | — | −0.0433 | 0.748 |
| 11 | 0.31 | 0.26 | 0.95 | 0.049 | 0.110 | 0.25 | 0.105 | 0.130 | 0.005 | 0.0060 | Cu: 0.27, Ni: 0.15 | −0.0554 | 0.677 |
| 12 | 0.28 | 0.22 | 0.65 | 0.055 | 0.105 | 0.25 | 0.060 | 0.120 | 0.004 | 0.0068 | — | −0.0606 | * 0.513 |
| 13 | 0.32 | 0.28 | 0.80 | 0.055 | 0.082 | 0.25 | * 0.020 | 0.168 | 0.005 | 0.0059 | — | * 0.0249 | * 0.539 |
| 14 | 0.35 | 0.27 | 0.90 | 0.054 | 0.095 | 0.25 | 0.145 | 0.182 | 0.005 | 0.0059 | — | * 0.0194 | 0.785 |
| 15 | 0.30 | 0.24 | 0.80 | 0.052 | * 0.044 | 0.23 | 0.065 | 0.110 | 0.004 | 0.0052 | — | * 0.0263 | 0.612 |
| 16 | * 0.42 | 0.40 | 1.20 | 0.055 | 0.110 | 0.28 | 0.080 | 0.140 | 0.006 | 0.0065 | — | −0.0471 | * 0.817 |
| 17 | 0.40 | 0.48 | 1.25 | 0.055 | * 0.041 | 0.20 | 0.100 | 0.150 | 0.006 | 0.0065 | — | * 0.0664 | * 0.879 |
| 18 | 0.40 | 0.48 | 0.91 | 0.055 | 0.110 | 0.20 | * 0.180 | 0.170 | 0.006 | 0.0065 | — | −0.0171 | * 0.894 |
| 19 | * 0.44 | 0.45 | 1.40 | 0.056 | 0.120 | 0.22 | 0.120 | * 0.220 | 0.006 | 0.0059 | — | * 0.0199 | * 0.927 |
| 20 | * 0.70 | 0.19 | 0.49 | * 0.009 | 0.063 | 0.14 | 0.030 | * — | 0.016 | 0.0070 | — | −0.1183 | * 0.853 |

Et = [Ti] − 3.4[N] − 1.5[S]
Ceq = [C] + ([Si]/10) + ([Mn]/5) + (5[Cr]/22) + (33[V]/20) − (5[S]/7)
* represents deviation from the range of the chemical composition specified by the present invention.

Each of the aforementioned ingots was once hot-forged into a square bar 55 mm on each side, and thereafter cooled down to a room temperature. Subsequently, each square bar 55 mm on each side was heated at 1523 K (1250° C.), and then was maintained for one hour, and thereafter was hot-forged into a round bar having a diameter of 35 mm while keeping the finish temperature not to be below 1273 K (1000° C.). After the hot forging process is completed, each bar was subjected to allowing cooling in the atmosphere.

In Steel 1, Steel 5 and Steel 7, different from the above procedure, each square bar 55 mm on each side was heated at 1423 K (1150° C.), and then was maintained for one hour, and thereafter was hot-forged into a round bar whose diameter is 35 mm while keeping the finish temperature not to be below 1223 K (950° C.). After the hot forging process is completed, each bar was subjected to allowing cooling in the atmosphere.

Various test specimens were collected from each round bar having a diameter of 35 mm produced in the above manner, and an investigation was conducted on a microstructure, a tensile property, a fatigue strength, an impact property, and machinability thereof.

The microstructure was observed in such a manner that test pieces having observation surfaces parallel to a forging axis (longitudinal cross sectional surface) of each round bar were cut out, were filled with resin and then mirror-polished, and thereafter they were etched with a nital solution; and then an observation was conducted on each test specimen at an R/2 portion ("R" indicates a radius of the round bar) thereof with an optical microscope with magnification of 100× and 400×.

Tensile test specimens, fatigue test specimens, and impact test specimens were cut out in such a manner that a longitudinal direction of each test specimen becomes parallel to the forging axis of each round bar. Specifically, the tensile test specimens and the impact test specimens were cut out from the R/2 portion of each round bar, and the fatigue test specimens were cut out from the central portion of each round bar, and then the respective test specimens were machined to have respective shapes in FIG. 2, FIG. 3, and FIG. 4.

Figure 2:
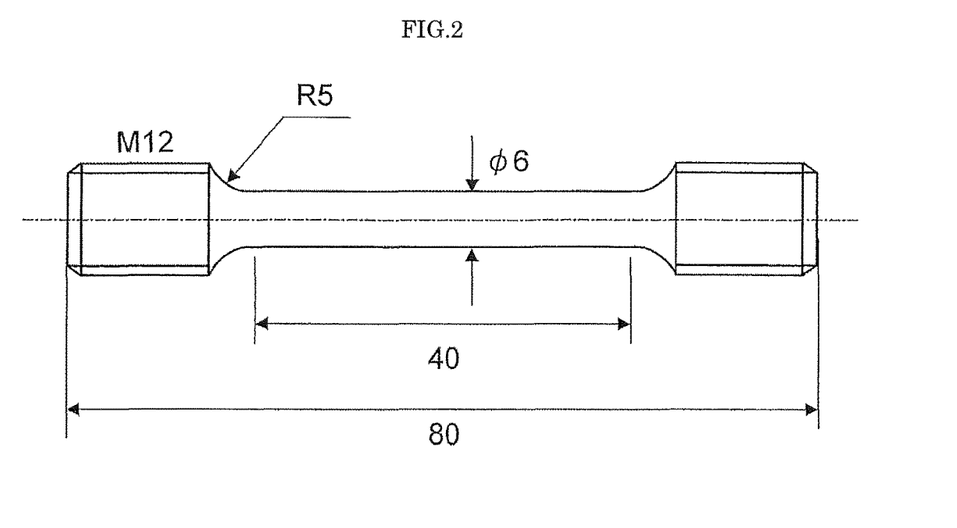
FIG. 2 is a drawing showing a shape of a test specimen used in a tensile test in Example. The unit of the dimension is mm.

The tensile test was conducted by using the tensile test specimens shown in FIG. 2 under the control of the crosshead displacement at a room temperature, and in the atmosphere, and the strain rate was adjusted to be within a range of $10^{-3}$ to $10^{-4}$/s. The tensile strength (TS) was found based on the obtained data regarding "load versus elongation".

Figure 3:
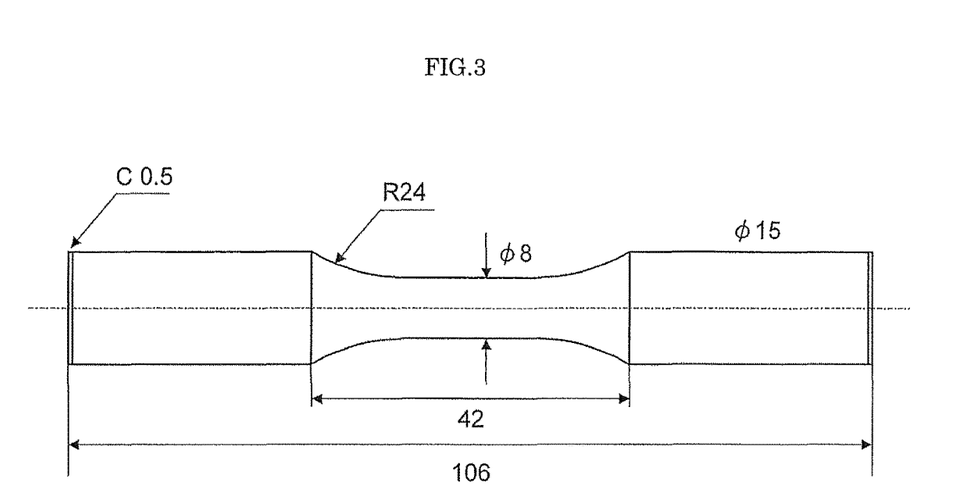
FIG. 3 is a drawing showing a shape of a test specimen used in an Ono type rotating bending fatigue test in Example. The unit of the dimension is mm.

The fatigue test was conducted by using an Ono type rotating bending fatigue test machine with smoothed test pieces of FIG. 3 at a room temperature, and in the atmosphere. The number of rotations was set to be 3400 rpm, and the maximum stress that causes no fracture in $10^7$ cycles of repetitively applying stress was defined as the fatigue strength (σw).

Figure 4:
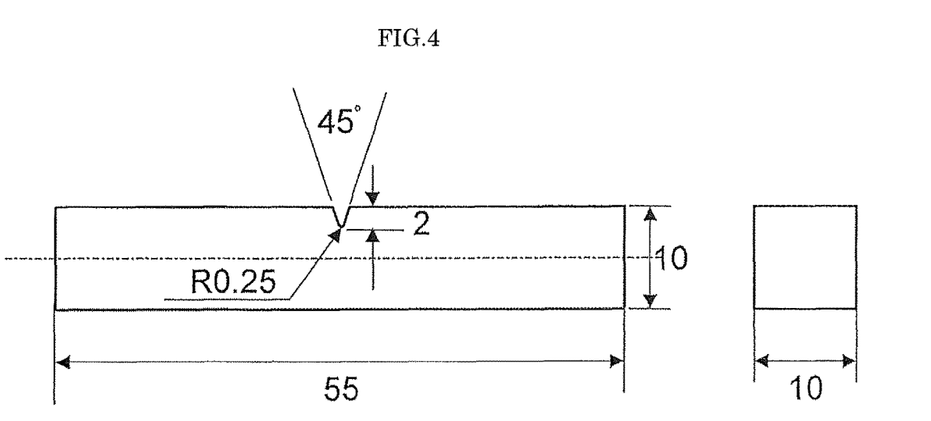
FIG. 4 is a drawing showing a shape of a test specimen used in an impact test in Example. The unit of the dimension is mm.

The impact test was conducted with a common method by using a Charpy impact testing machine with V notched test specimens set forth in JIS Z 2242 (2005) as shown in FIG. 4 at a room temperature, and in the atmosphere.

The machinability was evaluated in such a manner that a plate-like test specimen having a thickness of 10 mm, a width of 30 mm, and a length of 300 mm was cut out from a central portion of each round bar, through holes each having a depth of 10 mm were formed by a drill, and then the amount of corner wear of the drill (amount of wear on the outermost circumference of the drill; referred to as an average value of widths of wear surfaces generated on two cutting blades of the drill) after drilling 100 through holes was formed.

The amount of corner wear of the drill was 0.53 mm when Steel 20 which is equivalent to the steel for a cracking connecting rod having a carbon content of 0.7% set forth in Patent Document 1 was drilled, therefore this value was defined as a reference value, and the test specimen was judged to have targeted preferable machinability when the amount of corner wear was less than 50% of the reference value, that is, less than 0.265 mm.

The drilling test condition is as follows.

Drill: straight shank drill of SKH 51 having a diameter of 8 mm

Number of rotations: 754 rpm

Feed: 0.15 mm/rev

Lubricant: water-soluble lubricant

Each result of the above tests is comprehensively shown in Table 2. The value "y" in Table 2 is a value calculated regarding the holding temperature for each square bar 55 mm on each side obtained by using Formulas <1>, <3>, and <4>.

TABLE 2

| Test No. | Steel | Temperature T | y | Microstructure | TS (MPa) | σw (MPa) | v $E_{RT}$ (J/cm²) | Drill Corner Wear (mm) | Note |
|---|---|---|---|---|---|---|---|---|---|
| 1 | 1 | 1523 K (1250° C.) | 0.0077 | F + P | 915 | 460 | 3.2 | 0.15 | Present Invention |
| 2 | 2 | | 0.0109 | F + P | 910 | 455 | 3.1 | 0.14 | |
| 3 | 3 | | 0.0115 | F + P | 900 | 450 | 2.8 | 0.11 | |
| 4 | 4 | | 0.0145 | F + P | 900 | 460 | 4.0 | 0.10 | |
| 5 | 5 | | 0.0136 | F + P | 900 | 450 | 3.7 | 0.13 | |
| 6 | 6 | | 0.0163 | F + P | 910 | 460 | 3.8 | 0.15 | |
| 7 | 7 | | 0.0102 | F + P | 910 | 455 | 3.5 | 0.16 | |
| 8 | 8 | | 0.0106 | F + P | 915 | 460 | 3.6 | 0.17 | |
| 9 | 9 | | 0.0107 | F + P | 910 | 455 | 4.0 | 0.16 | |
| 10 | 10 | | 0.0114 | F + P | 915 | 455 | 4.5 | 0.19 | |
| 11 | 11 | | 0.0096 | F + P | 920 | 460 | 3.5 | 0.21 | |
| 12 | *12 | 1523 K (1250° C.) | 0.0089 | F + P | 800 | ** 395 | 7.0 | 0.08 | Comparison |
| 13 | *13 | | 0.0404 | F + P | 750 | ** 360 | ** 18.0 | 0.06 | |
| 14 | *14 | | 0.0365 | F + P | 920 | 465 | ** 15.0 | 0.18 | |
| 15 | *15 | | 0.0414 | F + P | 910 | 460 | ** 22.0 | 0.17 | |
| 16 | *16 | | 0.0107 | F + P | 920 | 460 | 4.6 | # 0.32 | |
| 17 | *17 | | 0.0747 | F + P | 930 | 460 | ** 19.5 | # 0.35 | |
| 18 | *18 | | 0.0178 | F + P | 950 | 475 | 3.5 | # 0.45 | |
| 19 | *19 | | 0.0368 | F + P + B | 950 | 460 | ** 26.0 | # 0.47 | |
| 20 | *20 | | 0.0050 | P | 940 | ** 360 | 7.0 | # 0.53 | |

TABLE 2-continued

| Test No. | Steel | Temperature T | y | Microstructure | TS (MPa) | σw (MPa) | $_vE_{RT}$ (J/cm$^2$) | Drill Corner Wear (mm) | Note |
|---|---|---|---|---|---|---|---|---|---|
| 21 | 1 | 1423 K | 0.0013 | F + P | 915 | 460 | 3.8 | 0.16 | Present |
| 22 | 5 | (1150° C.) | 0.0028 | F + P | 895 | 450 | 4.8 | 0.15 | Invention |
| 23 | 7 | | 0.0018 | F + P | 910 | 455 | 4.3 | 0.16 | |

Temperature T denotes holding temperature of the square bar 55 mm on each side,
"y" is a value obtained based on Et represented by the following Formula <1>, and Formulas <3> and <4>,
Et = [Ti] − 3.4[N] − 1.5[S] . . . <1>
y = {Et + (Et$^2$ + 6 × α(T))$^{0.5}$}/2 . . . <3>
α(T) = 10$^{\{-(17640/T)+8.20\}}$ . . . <4>
"F", "P", and "B" in the microstructure column denote ferrite, perlite, and baitnite, respectively,
"Present Invention" denotes Inventive Example, and "Comparison" denotes Comparative Example,
*represents deviation from the range of the chemical composition specified by the present invention, and
** represents deviation from the property value specified by the present invention,
# represents that the target is not achieved.

As obvious from Table 2, all the round bars each having a diameter of 35 mm for the test numbers 1 to 11 and 21 to 23 produced by using Steel 1 to Steel 11, which have the chemical composition specified in the present invention, satisfy the specification that $_vE_{RT}$ is 1.0 to 7.0 J/cm$^2$, and σw is 450 MPa or more; accordingly they are excellent in cracking property and fatigue resistance, and have preferable machinability.

The test number 11 was conducted by using the round bar of Steel 11 having a diameter of 35 mm, and containing Cu of 0.27% and Ni of 0.15%, and it is confirmed that a strength enhancing effect can be exerted by containing the above contents of Cu and Ni.

To the contrary, in the test number 12 using the round bar having a diameter of 35 mm, the value of Ceq of Steel 12 is smaller than the lower limit specified in the present invention, and thus σw does not satisfy the specification that σw is 450 MPa or more, which results in poor fatigue resistance.

In the test number 13 using Steel 13, the V content, Et, and Ceq among the conditions of the chemical composition specified by the present invention deviate from the range, and Ceq has a smaller value than the lower limit thereof, and thus, σw does not satisfy the specification that σw is 450 MPa or more, which results in poor fatigue resistance, and $_vE_{RT}$ has a greater than the specified upper limit, which results in poor fracture splitting performance.

In the test number 14 using Steel 14, Et deviates from the range of the chemical composition specified by the present invention, and thus $_vE_{RT}$ has a value greater than the specified upper limit thereof, which results in poor fracture splitting performance.

In the test number 15 using Steel 15, the S content and Et deviate from the range of the chemical composition specified by the present invention, and thus $_vER_T$ has a value greater than the specified upper limit thereof, which results in poor fracture splitting performance.

In the test number 16 using Steel 16, Ceq deviates from the range of the chemical composition specified by the present invention, and Ceq has a value greater than the specified upper limit thereof, and thus the amount of drill corner wear is greater than the target value of 0.265 mm, resulting in poor machinability.

In the test number 17 using Steel 17, the S content, Et, and Ceq deviate from the range of the chemical composition specified by the present invention. Because Et deviates from the range, $_vE_{RT}$ has a value greater than the specified upper limit thereof, resulting in poor fracture splitting performance and Ceq has a value greater than the upper limit thereof, and thus the amount of drill corner wear is also greater than the target value of 0.265 mm, resulting in poor machinability.

In the test number 18 using Steel 18, the V content and Ceq deviate from the range of the chemical composition specified in the present invention, and Ceq has a value greater than the upper limit thereof, and thus the amount of drill corner wear is greater than the target value of 0.265 mm, resulting in poor machinability.

In the test number 19 using Steel 19, the Ti content, Et, and Ceq deviate from the range of the chemical composition specified by the present invention. Because Et deviates from the range, $_vE_{RT}$ has a value greater than the specified upper limit thereof, resulting in poor fracture splitting performance, and because Ceq has a value greater than the upper limit thereof, the amount of drill corner wear is greater than the target value of 0.265 mm, resulting in poor machinability.

In the test number 20 using Steel 20 equivalent to the steel for a cracking connecting rod set forth in Patent Document 1, the C content, the P content, the Ti content, and Ceq deviate from the range of the chemical composition. The concept of Et specified by the present invention cannot be applied to this steel containing no Ti, but it is obvious that the test number 20 has poorer fatigue resistance and poorer machinability, compared to the present invention.

INDUSTRIAL APPLICABILITY

The non-post-heat treated steel of the present invention can be suitably used as a starting material of a non-post-heat treated steel member such as a connecting rod for an automobile engine which is fracture-split after being formed in a predetermined shape through hot forging, and in which high fatigue strength is required. The non-post-heat treated steel member of the present invention is excellent in cracking property and fatigue resistance property, and can be used as a connecting rod for an automobile engine or the like.

The invention claimed is:

1. Non-post-heat treated steel having a chemical composition consisting of: in mass %, C: 0.27 to 0.40%, Si: 0.15 to 0.70%, Mn: 0.55 to 1.40%, P: 0.049 to 0.061%, S: 0.099 to 0.15%, Cr: 0.10 to 0.60%, V: 0.030% to 0.140%, Ti: more than 0.100%, not more than 0.200%, Al: 0.002 to 0.050%, and N: 0.002 to 0.020%; the balance being Fe and impurities, wherein V+Ti≤0.3%, Et represented by Formula <1> is less than 0, and Ceq represented by Formula <2> is more than 0.60 and less than 0.80:

$$Et=[Ti]-3.4[N]-1.5[S] \qquad <1>$$

$$Ceq=[C]+([Si]/10)+([Mn]/5)+(5[Cr]/22)+(33[V]/20)-(5[S]/7) \qquad <2>$$

where a symbol of each element enclosed by [ ] in Formulas <1> and <2> denotes a content in mass % of the element in the steel.

2. Non-post-heat treated steel having a chemical composition consisting of: in mass %, C: 0.27 to 0.40%, Si: 0.15 to 0.70%, Mn: 0.55 to 1.40%, P: 0.049 to 0.061%, S: 0.099 to 0.15%, Cr: 0.10 to 0.60%, V: 0.030% to 0.140%, Ti: more than 0.100%, not more than 0.200%, Al: 0.002 to 0.050%, N: 0.002 to 0.020%, and one or more of Cu: 0.40% or less, and Ni: 0.30% or less; the balance being Fe and impurities, wherein V+Ti≤0.3%, Et represented by Formula <1> is less than 0, and Ceq represented by Formula <2> is more than 0.60 and less than 0.80:

$$Et=[Ti]-3.4[N]-1.5[S] \qquad <1>$$

$$Ceq=[C]+([Si]/10)+([Mn]/5)+(5[Cr]/22)+(33[V]/20)-(5[S]/7) \qquad <2>$$

where a symbol of each element enclosed by [ ] in Formulas <1> and <2> denotes a content in mass % of the element in the steel.

3. A non-post-heat treated steel member including the chemical composition according to claim 1, wherein a Charpy impact value at a room temperature is 1.0 to 7.0 J/cm$^2$, and fatigue strength is 450 MPa or more.

4. A non-post-heat treated steel member including the chemical composition according to claim 2, wherein a Charpy impact value at a room temperature is 1.0 to 7.0 J/cm$^2$, and fatigue strength is 450 MPa or more.

* * * * *